(12) United States Patent
Shimizu et al.

(10) Patent No.: US 9,703,183 B2
(45) Date of Patent: Jul. 11, 2017

(54) LIGHT SOURCE DEVICE AND PROJECTOR

(71) Applicant: SEIKO EPSON CORPORATION, Tokyo (JP)

(72) Inventors: Tetsuo Shimizu, Matsumoto (JP); Kiyoshi Kuroi, Nagahama (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/722,675

(22) Filed: May 27, 2015

(65) Prior Publication Data
US 2015/0346594 A1 Dec. 3, 2015

(30) Foreign Application Priority Data
Jun. 3, 2014 (JP) .................................. 2014-114733

(51) Int. Cl.
G03B 21/20 (2006.01)
G03B 21/16 (2006.01)
G03B 21/28 (2006.01)

(52) U.S. Cl.
CPC ........... *G03B 21/204* (2013.01); *G03B 21/16* (2013.01); *G03B 21/28* (2013.01)

(58) Field of Classification Search
CPC ...... G03B 21/204; G03B 21/20; G03B 21/00; G03B 21/28; G03B 21/16; G03B 21/14; F21S 2/00; F21V 9/16; F21V 13/08
USPC ......................................... 353/31; 362/80–89
See application file for complete search history.

(56) References Cited

U.S. PATENT DOCUMENTS

| 8,283,675 B2 | 10/2012 | Ohta et al. | |
| 8,833,975 B2 | 9/2014 | Kishimoto et al. | |
| 2011/0044046 A1* | 2/2011 | Abu-Ageel | F21K 9/00 362/259 |
| 2012/0106126 A1* | 5/2012 | Nojima | G02B 26/008 362/84 |
| 2016/0040857 A1* | 2/2016 | Inoue | C09K 11/7774 362/343 |

FOREIGN PATENT DOCUMENTS

| JP | 2010-192629 A | 9/2010 |
| JP | 2010-245481 A | 10/2010 |
| JP | 2012-059452 A | 3/2012 |
| JP | 2012-059453 A | 3/2012 |
| JP | 2012-059454 A | 3/2012 |
| JP | 2013-110199 A | 6/2013 |

* cited by examiner

*Primary Examiner* — Steven H Whitesell Gordon
*Assistant Examiner* — Jerry Brooks
(74) *Attorney, Agent, or Firm* — Oliff PLC

(57) ABSTRACT

A light source device includes a phosphor layer having a side surface, a bottom surface, and a top surface opposed to the bottom surface, a reflecting member opposed to the side surface of the phosphor layer, a substrate disposed on the bottom surface side of the phosphor layer, and an adhesive adapted to bond the phosphor layer and the substrate to each other. A surface of the substrate located on the phosphor layer side includes a recessed section overlapping the reflecting member on at least an outer side of the phosphor layer in a planar view. A part of the adhesive running off the phosphor layer is received by the recessed section. Fluorescence generated in the phosphor layer is emitted from the top surface and the side surface.

16 Claims, 9 Drawing Sheets

LIGHT SOURCE DEVICE AND PROJECTOR

BACKGROUND

1. Technical Field

The present invention relates to a light source device and a projector.

2. Related Art

In the light source device provided with a phosphor layer, it is desired that the light emitted from a side surface of the phosphor layer is efficiently used.

To cope with the above, there has been proposed a light source device having a configuration of covering a side surface of a light transmissive member including a fluorescent material with a light reflective member to thereby emit the fluorescence only from an upper surface of the light transmissive member as described in, for example, JP-A-2010-192629.

However, in the light source device in which the side surface of the light transmissive member having the phosphor material is covered with the light reflective member as in the light source device described above, the manufacturing method has become complicated in some cases.

In contrast, it is possible to adopt a configuration, in which a phosphor layer is bonded to a surface of a substrate with an adhesive, and a reflective member is disposed around the phosphor layer, as a simple configuration of the light source device capable of efficiently use the light emitted from the side surface. However, in this configuration, the adhesive for fixing the phosphor layer spreads outward from the phosphor layer on the substrate wetting the surface of the substrate, and it has been difficult to dispose a reflecting member in the vicinity of the phosphor layer. Thus, the distance between the phosphor layer and the reflecting member increases, and an apparent light emitting area of the fluorescence emitted increases in some cases. Therefore, in some cases, light use efficiency cannot sufficiently be improved in, for example, a projector using the light source device.

SUMMARY

An advantage of some aspects of the invention is to provide a light source device capable of improving the light use efficiency, and a projector provided with such a light source device.

A light source device according to an aspect of the invention includes a phosphor layer having a side surface, a bottom surface, and a top surface opposed to the bottom surface, a reflecting member opposed to the side surface of the phosphor layer, a substrate disposed on the bottom surface side of the phosphor layer, and an adhesive adapted to bond the phosphor layer and the substrate to each other, a surface of the substrate located on the phosphor layer side includes a recessed section overlapping the reflecting member on at least an outer side of the phosphor layer in a planar view, a part of the adhesive running off the phosphor layer is received by the recessed section, and fluorescence generated in the phosphor layer is emitted from the top surface and the side surface.

According to the light source device of the aspect of the invention, since the adhesive running off the phosphor layer is received by the recessed section, it is possible to dispose the reflecting member at a position close to the phosphor layer. Thus, since the distance between the reflecting member and the phosphor layer can be made shorter, an apparent light emitting area of the fluorescence thus emitted can be made smaller. Therefore, according to the light source device of the aspect of the invention, the light source device capable of improving the light use efficiency can be obtained.

The light source device may be configured such that the recessed section extends to apart below the phosphor layer, and includes the phosphor layer in the planar view.

According to this configuration, by disposing the phosphor layer inside the recessed section in the planar view, the phosphor layer can be aligned with accuracy.

The light source device may be configured such that an air gap is disposed between the phosphor layer and the reflecting member.

According to this configuration, the light use efficiency can further be improved.

The light source device may be configured such that an air gap is disposed between the reflecting member and the adhesive.

According to this configuration, even in the case in which manufacturing variations occur, the adhesive can be inhibited from overflowing from the recessed section.

The light source device may be configured such that a side surface of the reflecting member opposed to the phosphor layer has a tilted surface disposed in an area higher than at least the top surface using the bottom surface as a basis of height.

According to this configuration, since the tilted surface is capable of changing the proceeding direction of the light emitted from the top surface of the phosphor layer with a large emission angle, the divergence angle of the light emitted from the fluorescent material can be made smaller. Thus, the efficiency of the light emitted from the fluorescent material can be improved.

The light source device may be configured such that the reflecting member is disposed on the substrate.

According to this configuration, manufacturing is simple and easy.

The light source device may be configured such that the light source device includes a rotational mechanism adapted to rotate the substrate.

According to this configuration, the phosphor layer can be inhibited from rising in temperature to a high temperature level.

The light source device may be configured such that the phosphor layer is transparent.

According to this configuration, the phosphor layer can be inhibited from locally rising in temperature to a high temperature level.

The light source device may be configured such that the light emitted from the phosphor layer includes the fluorescence generated in the phosphor layer.

According to this configuration, the excitation light use efficiency can be improved.

A projector according to an aspect of the invention includes a light source device adapted to emit illumination light, a light modulation device adapted to modulate the illumination light in accordance with image information to form image light, and a projection optical system adapted to project the image light, and the light source device described above is used as the light source device.

According to the projector of the aspect of the invention, since the light source device described above is provided, the projector capable of improving the light use efficiency can be obtained.

BRIEF DESCRIPTION OF THE DRAWINGS

The invention will be described with reference to the accompanying drawings, wherein like numbers reference like elements.

FIGS. 2A and 2B are diagrams showing a wavelength conversion element according to the first embodiment, wherein FIG. 2A is a plan view, and FIG. 2B is a IIB-IIB cross-sectional view in FIG. 2A.

FIGS. 5A and 5B are diagrams showing a wavelength conversion element according to a second embodiment of the invention, wherein FIG. 5A is a plan view, and FIG. 5B is a VB-VB cross-sectional view in FIG. 5A.

FIGS. 7A and 7B are diagrams showing a wavelength conversion element according to a third embodiment of the invention, wherein FIG. 7A is a plan view, and FIG. 7B is a VIIB-VIIB cross-sectional view in FIG. 7A.

FIGS. 9A and 9B are diagrams showing a wavelength conversion element according to the fourth embodiment, wherein FIG. 9A is a plan view, and FIG. 9B is a IXB-IXB cross-sectional view in FIG. 9A.

FIGS. 10A and 10B are diagrams showing a wavelength conversion element according to a comparative example, wherein FIG. 10A is a plan view, and FIG. 10B is a XB-XB cross-sectional view in FIG. 10A.

DESCRIPTION OF EXEMPLARY EMBODIMENTS

Figure 1:
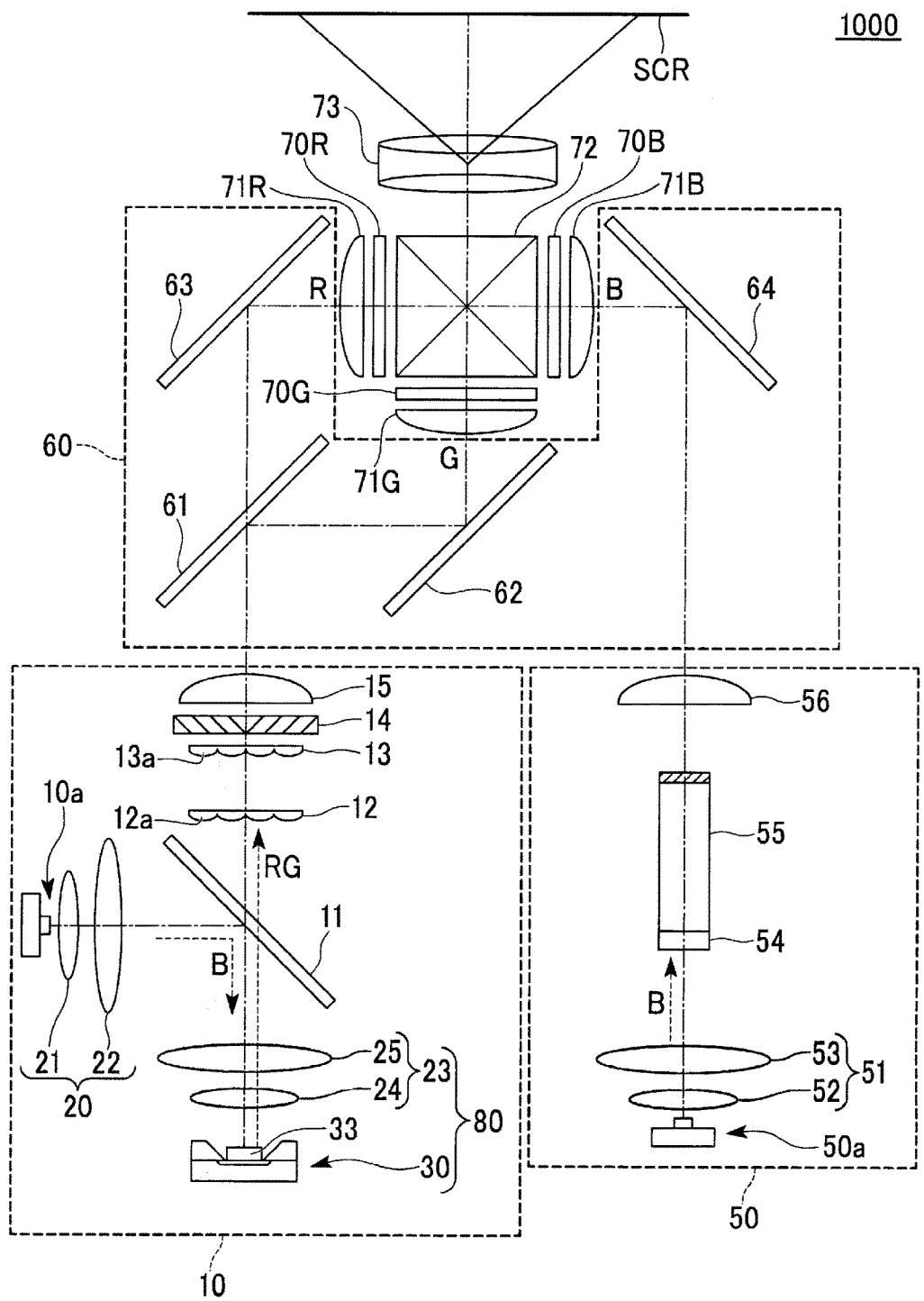
FIG. 1 is a general configuration diagram showing a projector according to a first embodiment of the invention.

Hereinafter, a projector according to an embodiment of the invention will be explained with reference to the accompanying drawings.

It should be noted that the scope of the invention is not limited to the embodiments hereinafter described, but can arbitrarily be modified within the technical idea or the technical concept of the invention. Further, in the drawings hereinafter explained, the actual structures and the structures of the drawings might be made different from each other in scale size, number, and so on in order to make each constituent easy to understand.

First Embodiment

FIG. 1 is a schematic configuration diagram showing a projector 1000 according to the present embodiment. In FIG. 1, red light is denoted by R, green light is denoted by G, and blue light is denoted by B, respectively.

As shown in FIG. 1, the projector 1000 according to the present embodiment is provided with an illumination device 10, a second illumination device 50, a color separation light guide optical system 60, a liquid crystal panel 70R, a liquid crystal panel 70G, a liquid crystal panel 70B, a collecting lens 71R, a collecting lens 71G, a collecting lens 71B, a cross dichroic prism 72, and a projection optical system 73. The liquid crystal panel 70R, the liquid crystal panel 70G, and the liquid crystal panel 70B correspond to a light modulation device in the appended claims.

The illumination device 10 is provided with an excitation light source 10a, a collimating optical system. 20, a dichroic mirror 11, a light source device 80, a first lens array 12, a second lens array 13, a polarization conversion element 14, and an overlapping lens 15.

The excitation light source 10a emits excitation light entering a wavelength conversion element 30. As the excitation light source 10a, a laser source for emitting the blue light (having a wavelength of about 445 nm) is used in the present embodiment. It should be noted that the laser source 10a can be formed of a single laser source, or can also be formed of a number of laser sources. Further, the laser source for emitting the blue light with the wavelength other than 445 nm (e.g., 460 nm) as the blue light can also be used.

The collimating optical system 20 is provided with a first lens 21 and a second lens 22.

The first lens 21 suppresses the spread of the light from the excitation optical system 10a.

The second lens 22 roughly collimates the light emitted from the first lens 21.

The first lens 21 and the second lens 22 are each formed of a convex lens in the present embodiment.

The collimating optical system. 20 has a function of roughly collimating the light from the excitation light source 10a as a whole.

The dichroic mirror 11 has a wavelength selecting transmissive film, which reflects the light in a predetermined wavelength band and transmits the light in another wavelength band, formed on a substrate. In the present embodiment, the dichroic mirror 11 reflects a blue light component while transmitting a red light component and a green light component. The dichroic mirror 11 reflects the excitation light (the blue light) emitted by the excitation light source 10a so as to bend as much as roughly 90 degrees. The excitation light having been reflected by the dichroic mirror 11 enters a light collection optical system 23.

The light source device 80 emits illumination light. The light source device 80 is provided with the light collection optical system 23 and the wavelength conversion element 30 in the present embodiment.

The light collection optical system 23 has a function of making the blue light from the dichroic mirror 11 enter the wavelength conversion element 30 in a roughly focused state, and a function as a collimator of roughly collimating fluorescent light emitted from the wavelength conversion element 30. The light collimation optical system 23 is provided with a first lens 24 and a second lens 25. The first lens 24 and the second lens 25 are each formed of a convex lens in the present embodiment.

The wavelength conversion element 30 is an optical element for converting the excitation light having been input into fluorescence and then emitting the result. In the present embodiment, the wavelength conversion element 30 is a reflective wavelength conversion element, and emits the fluorescence to the same side as the side to which the excitation light is input. In the present embodiment, the wavelength conversion element 30 converts the excitation light as the blue light into the fluorescence including the red light and the green light. A configuration of the wavelength conversion element 30 will be described in detail in the latter part.

The fluorescence having been emitted from the wavelength conversion element 30, namely the red light and the green light, are emitted from the light source device 80 via the light collection optical system 23 (collimator). The fluorescence having been emitted from the light source device 80 enters the first lens array 12 passing through the dichroic mirror 11.

The first lens array 12 has a plurality of first small lenses 12a for dividing the light having been input into a plurality of partial light beams. The plurality of first small lenses 12a is arranged in a plane, which is perpendicular to the optical axis of the light entering the first lens array 12, in a matrix.

The second lens array 13 has a plurality of second small lenses 13a corresponding to the plurality of first small lenses 12a of the first lens array 12. The second lens array 13 has a function of imaging the image of each of the first small lenses 12a of the first lens array 12 in the vicinities of the image forming areas of the liquid crystal panel 70R, the liquid crystal panel 70G, and the liquid crystal panel 70B in cooperation with the overlapping lens 15.

The light divided by the first lens array 12 enters the polarization conversion element 14 via the second lens array 13.

The polarization conversion element 14 converts each of the partial light beams divided by the first lens array 12 into linearly polarized light polarized in a predetermined direction.

The overlapping lens 15 collects each of the partial light beams from the polarization conversion element 14, and then overlaps the result in the vicinities of the image forming areas of the liquid crystal panel 70R, the liquid crystal panel 70G, and the liquid crystal panel 70B. It should be noted that the overlapping lens 15 can also be formed of a compound lens having a plurality of lenses combined with each other.

The first lens array 12, the second lens array 13, and the overlapping lens 15 constitute a lens integrator optical system for homogenizing the illuminance distribution in illumination target areas.

It should be noted that a rod integrator optical system provided with an integrator rod can also be used instead of the lens integrator optical system.

The light having been emitted from the overlapping lens 15, namely the light having been emitted from the illumination device 10 enters the color separation light guide optical system 60.

The second illumination device 50 is provided with a light source 50a, a light collection optical system 51, a scattering plate 54, a polarization conversion integrator rod 55, and a collecting lens 56.

As the light source 50a, a laser source for emitting blue light (having a wavelength of about 445 nm) is used in the present embodiment. It should be noted that the light source 50a can be formed of a single laser source, or can also be formed of a number of laser sources. Further, the laser source for emitting the blue light with the wavelength other than 445 nm (e.g., 460 nm) as the blue light can also be used.

The light having been emitted from the light source 50a enters the light collection optical system 51.

The light collimation optical system 51 is provided with a first lens 52 and a second lens 53. The light collection optical system 51 collectively makes the blue light enter the scattering plate 54 in a roughly focused state. The first lens 52 and the second lens 53 are each formed of a convex lens.

The scattering plate 54 scatters the blue light emitted from the light source 50a at a predetermined scattering degree to convert the blue light into blue light having a light distribution similar to the fluorescence emitted from the wavelength conversion element 30. As the scattering plate 54, obscured glass made of optical glass, for example, can be used.

The polarization conversion integrator rod 55 homogenizes the in-plane light intensity distribution of the blue light having been emitted from the light source 50a, and at the same time, converts the blue light into the linearly-polarized light polarized in a predetermined direction, and then emits the result. Although the detailed explanation is omitted, the polarization conversion integrator rod has an integrator rod, a reflecting plate, which is disposed on the plane-of-incidence side of the integrator rod and provided with a small hole through which the blue light enters, and a reflective polarization plate disposed on the exit surface side.

It should be noted that a lens integrator optical system and a polarization conversion element can also be used instead of the polarization conversion integrator rod.

The collecting lens 56 collects the light from the polarization conversion integrator rod 55, and then makes the light enter the color separation light guide optical system 60.

The color separation light guide optical system 60 is provided with a dichroic mirror 61, a reflecting mirror 62, a reflecting mirror 63, and a reflecting mirror 64. The color separation light guide optical system 60 separates the light having been emitted from the illumination device 10 into the red light and the green light to guide the red light and the green light respectively to the liquid crystal panels 70R and 70G to be the illumination targets, and at the same time guide the blue light, which has been emitted from the second illumination device 50, to the liquid crystal panel 70B.

Collecting lenses 71R, 71G, and 71B are disposed between the color separation light guide optical system 60 and the liquid crystal panels 70R, 70G, and 70B, respectively.

The dichroic mirrors 61 has a wavelength selecting transmissive film, which reflects the light in a predetermined wavelength band and transmits the light in another wavelength band, formed on a substrate. In the present embodiment, the dichroic mirror 61 transmits the red light component while reflecting the green light component. The reflecting mirror 63 reflects the red light component. The reflecting mirror 62 reflects the green light component. The reflecting mirror 64 reflects the blue light component.

The red light having been transmitted through the dichroic mirror 61 out of the light input from the illumination device 10 is reflected by the reflecting mirror 63, and passes through the collecting lens 71R, and then enters the image forming area of the liquid crystal panel 70R for the red light. The green light having been reflected by the dichroic mirror 61 out of the light input from the illumination device 10 is further reflected by the reflecting mirror 62, and passes through the collecting lens 71G, and then enters the image forming area of the liquid crystal panel 70G for the green light.

The blue light having been input from the second illumination device 50 is reflected by the reflecting mirror 64, passes through the collecting lens 71B, and then enters the image forming area of the liquid crystal panel 70B for the blue light.

The liquid crystal panel 70R, the liquid crystal panel 70G, and the liquid crystal panel 70B are each a transmissive panel having a liquid crystal as an electrooptic material encapsulated by a pair of transparent glass substrates. On the side of each of the liquid crystal panel 70R, the liquid crystal panel 70G, and the liquid crystal panel 70B, to which the light is input, there is disposed an entrance side polarization plate not shown, and on the side thereof, from which the light is emitted, there is disposed an exit side polarization plate not shown.

The liquid crystal panel 70R, the liquid crystal panel 70G, and the liquid crystal panel 70B are each provided with, for example, a polysilicon TFT as a switching element, and each modulate the polarization direction of the linearly-polarized light input from the entrance side polarization plate in accordance with an image signal supplied.

The cross dichroic prism 72 is an optical element for combining the optical images, which are modulated by the respective liquid crystal panels for respective colored light beams and then emitted from the respective exit side polarization plates, with each other to thereby form the color image light. The cross dichroic prism 72 has a substantially rectangular planar shape formed of four rectangular prisms bonded to each other, and on the substantially X-shaped interfaces on which the rectangular prisms are bonded to each other, there are formed optical multilayer films. The optical multilayer film formed on one of the roughly X-shaped interfaces is for reflecting the red light, and the optical multilayer film formed on the other of the interfaces is for reflecting the blue light. The red light and the blue light are respectively bent by these optical multilayer films to have the proceeding directions aligned with the proceeding direction of the green light, thus the three colored light beams are combined with each other.

The color image light emitted from the cross dichroic prism 72 is projected by the projection optical system 73 in an enlarged manner to form a projection image (a color image) on the screen SCR.

Then, the wavelength conversion element 30 will be described in detail.

Figure 2A:
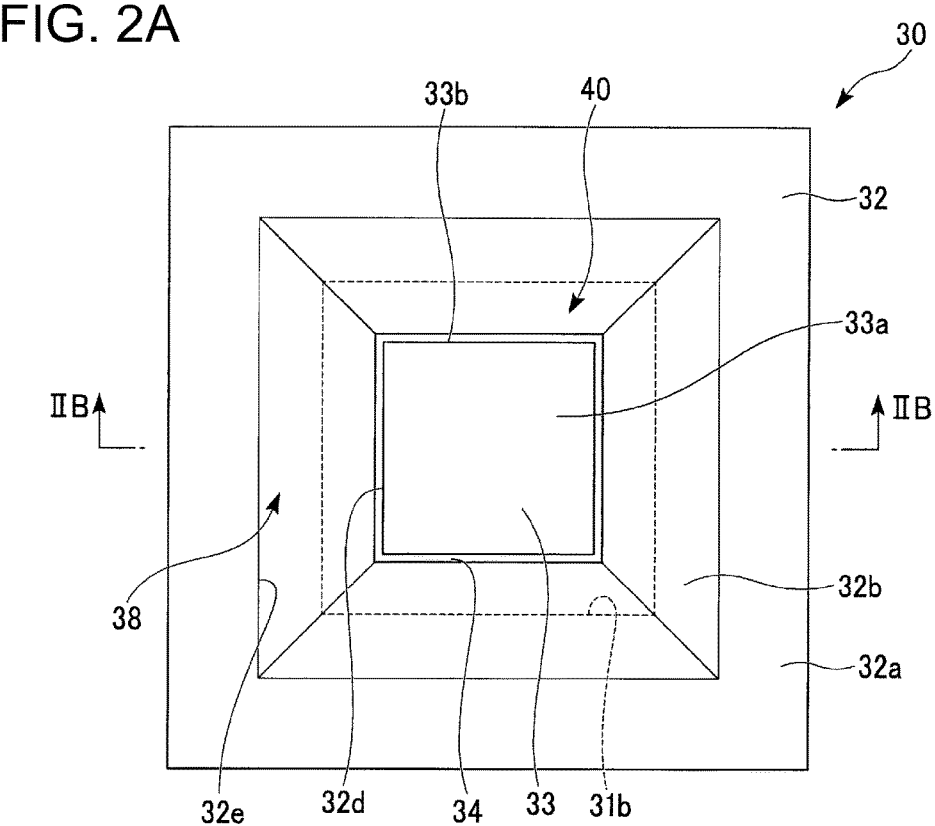
Figure 2B:
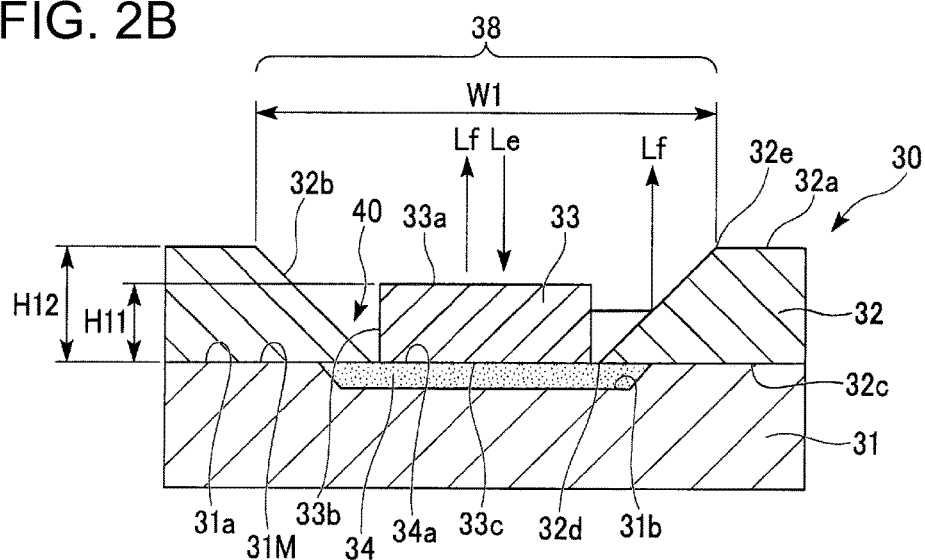

FIGS. 2A and 2B are diagrams showing the wavelength conversion element 30. FIG. 2A is a plan view. FIG. 2B is a IIB-IIB cross-sectional view in FIG. 2A.

It should be noted that in the present specification, it is assumed that the side of the wavelength conversion element 30, to which the excitation light is input, is an upper side, and the opposite side of the wavelength conversion element 30 to the side thereof on which the excitation light is incident is a lower side. Further, the height of the bottom surface of a phosphor layer described later is assumed to be a basis of the height.

The wavelength conversion element 30 according to the present embodiment is provided with a substrate 31, an adhesive 34, a phosphor layer 33, and a reflecting member 32 as shown in FIGS. 2A and 2B. The phosphor layer 33 has a side surface 33b, a bottom surface 33c, and a top surface 33a opposed to the bottom surface 33c.

The substrate 31 is a member having a roughly plate-like shape. A top surface 31M of the substrate 31 located on the phosphor layer 33 side is provided with a recessed section 31b and a flat section 31a. The planar view shape of the recessed section 31b is not particularly limited, but can also be a circular shape, a rectangular shape, or a polygonal shape. In the present embodiment, the planar view shape of the recessed section 31b is a square shape as shown in FIG. 2A. The recessed section 31b partially overlaps the reflecting member 32 in the outside of the phosphor layer 33 in the planar view. In the present embodiment, the recessed section 31b extends to a part below the phosphor layer 33, and includes the phosphor layer 33 in the planar view. The inner surface of the recessed section 31b is formed so as to obliquely expand in four directions upward from a bottom surface of the recessed section 31b.

The dimensions of the recessed section 31b, namely the width and the depth, are arbitrarily determined in accordance with the thickness and the amount of the adhesive 34, the mass of the phosphor layer 33, and so on.

It should be noted that in the present specification, the description that something is included in the recessed section includes the fact that the thing is disposed at the position overlapping the recessed section in the planar view.

On the top surface 31M side of the substrate 31, there are disposed the phosphor layer 33 and the reflecting member 32 as shown in FIG. 2B. In other words, the substrate 31 is disposed on the bottom surface 33c side of the phosphor layer 33.

It is preferable for the substrate 31 to be formed of metal high in thermal conductivity such as aluminum (Al) or copper (Cu). This is because it is easy to radiate the heat of the phosphor layer 33.

The phosphor layer 33 is fixed to the substrate 31 with the adhesive 34. The whole of the adhesive 34 is housed inside the recessed section 31b of the substrate 31 in the present embodiment. In other words, as shown in FIG. 2A, a part of the adhesive 34 running off the phosphor layer 33 in the planar view is housed in the recessed section 31b.

In the present embodiment, as shown in FIG. 2B, the top surface 34a of the adhesive 34 is smoothly connected to the flat section 31a of the substrate 31. In other words, the top surface 34a of the adhesive 34 and the flat section 31a of the substrate 31 are coplanar with each other. The bottom surface 33c of the phosphor layer 33 is bonded to the top surface 34a of the adhesive 34.

The material of the adhesive 34 is not particularly limited, but can also be resin or metal. As the adhesive 34, it is possible to use such an adhesive that resin and metal are mixed with each other before curing, and the resin is volatilized by curing.

The phosphor layer 33 generates the fluorescence Lf by the irradiation with the excitation light Le from the excitation light source 10a. The shape of the phosphor layer 33 is not particularly limited, but can also be a columnar shape, a quadratic prism shape, or a frustum shape. In the present embodiment, the shape of the phosphor layer 33 is, for example, a square prism shape as shown in FIGS. 2A and 2B.

It is preferable that a water-repellent treatment is applied to the side surface 33b of the phosphor layer 33. This is because in the case of using a resin adhesive material as the adhesive 34, for example, it is possible to inhibit the adhesive 34 from crawling up to the side surface 33b of the phosphor layer 33 when fixing the phosphor layer 33 to the surface of the substrate 31 using the adhesive 34.

The bottom surface 33c of the phosphor layer 33 is bonded to the top surface 34a of the adhesive 34. In the present embodiment, since the top surface 34a of the adhesive 34 is smoothly connected to the flat section 31a of the substrate 31, the height of the flat section 31a of the substrate 31 and the height of the bottom surface 33c of the phosphor layer 33 are roughly the same.

A reflecting film not shown is provided to the bottom surface 33c of the phosphor layer 33. The reflecting film is formed of, for example, metal high in reflectance such as silver (Ag) or aluminum (Al).

In the present embodiment, the phosphor layer 33 is an optical member, which is excited by the light in the ultraviolet range through the blue range to emit light. Although not shown in the drawings, the phosphor layer 33 is configured including, for example, a base material and a plurality of phosphor particles dispersed in the base material.

As the phosphor particles, a rare earth fluorescent material, a sialon fluorescent material, or the like can be used. In detail, $Y_3Al_5O_{12}$:Ce (YAG:Ce) can be used as the rare earth fluorescent material, and α-sialon or the like can be used as the sialon fluorescent material. Further, as the phosphor layer 33, a sintered body obtained by mixing the phosphor particles and alumina or the like as the base material with each other, a material formed of glass or resin as the base material including the phosphor particles, or the like can be used. Further, a sintered body formed only of the phosphor particles or the like can be used.

The fluorescence generated in the phosphor layer 33 is emitted from the top surface 33a and the side surface 33b.

The reflecting member 32 is disposed so as to be opposed to the side surface 33b of the phosphor layer 33. The reflecting member 32 is fixed to the surface of the flat section 31a of the substrate 31. The fixation method of the reflecting member 32 is not particularly limited, but can also be a method of bonding with an adhesive, or can also be a method of fixing with screws, or can also be a method of pressing the reflecting member 32 against the substrate 31 with another member to thereby fix the reflecting member 32.

The planar view shape of the reflecting member 32 is a rectangular ring-like shape in the present embodiment as shown in FIG. 2A. As shown in FIG. 2B, the shape of a cross-section of the reflecting member 32 perpendicular to a top surface 32a is, for example, a trapezoidal shape. Inside the reflecting member 32, there is disposed the phosphor layer 33. The reflecting member 32 is provided with a tilted surface 32b, which is side surface connecting the top surface 32a and a bottom surface 32c to each other. The tilted surface 32b is tilted so that the distance from the side surface 33b of the phosphor layer 33 increases in the direction from the bottom surface 32c toward the top surface 32a of the reflecting member 32. In the present embodiment, the tilted surface 32b is tilted about 45 degrees with respect to the flat section 31a of the substrate 31.

In the present embodiment, the height H12 of the top surface 32a of the reflecting member 32 is larger than the height H11 of the top surface 33a of the phosphor layer 33. Thus, the top end portion of the tilted surface 32b is disposed in an area higher than the top surface 33a of the phosphor layer 33. An inner edge 32d of the reflecting member 32 on the bottom surface 32c side is disposed adjacent to the phosphor layer 33.

Here, in the present specification, the description that the reflecting member is disposed adjacent to the phosphor layer includes the fact that at least a part of the reflecting member is disposed inside the area in which the adhesive for bonding the phosphor layer extends. In other words, in the present specification, the description that the reflecting member is disposed adjacent to the phosphor layer includes the fact that the adhesive for bonding the phosphor layer is disposed below at least a part of the reflecting member.

The reflecting member 32 is formed of metal high in reflectance such as silver (Ag) or aluminum (Al), an optical multilayer film, ceramics including gas pockets, or the like. As the reflecting member 32, there can be used a member having particles (including air), which are different in refractive index from the base material such as glass or resin, dispersed in the base material.

Between the phosphor layer 33 and the reflecting member 32, there is disposed an air gap 40. The air gap 40 is disposed so as to surround the phosphor layer 33 in the planar view as shown in FIG. 2A. In the present embodiment, the width of the air gap 40, namely the distance from the side surface 33b of the phosphor layer 33 to the tilted surface 32b of the reflecting member 32 increases in the upward direction from the flat section 31a of the substrate 31.

When the excitation light Le enters the phosphor layer 33 of the wavelength conversion element 30 through the top surface 33a, the excitation light Le is converted by the phosphor layer 33 into the fluorescence Lf, and the fluorescence Lf is emitted from the top surface 33a and the side surface 33b of the phosphor layer 33. Among the fluorescence Lf emitted from the phosphor layer 33, the light emitted from the side surface 33b is reflected by the tilted surface 32b to be bent roughly 90 degrees, and proceeds upward. Thus, the fluorescence Lf emitted from the top surface 33a and the side surface 33b of the phosphor layer 33 is emitted toward the same side as the side irradiated by the excitation light Le. The apparent light emitting area 38 from which the fluorescence Lf is emitted corresponds to an area surrounded by an inner edge 32e of the end portion of the reflecting member 32 located on the top surface 32a side in the planar view.

Then, an example of a manufacturing method of the wavelength conversion element 30 according to the present embodiment will be explained.

Firstly, the substrate 31 provided with the recessed section 31b is prepared, and then, an uncured resin adhesive 34 is applied to the inside of the recessed section 31b.

Then, the phosphor layer 33 is disposed on the top surface 34a of the uncured adhesive 34.

Then, the reflecting member 32 is fixed to the surface of the flat section 31a of the substrate 31 so as to surround the phosphor layer 33.

Then, the uncured adhesive 34 is burnt to cure.

Due to the process described above, the wavelength conversion element 30 is manufactured.

According to the present embodiment, since the adhesive 34 is received inside the recessed section 31b provided to the substrate 31, the size of the fluorescence emitted from the wavelength conversion element 30 can be made smaller. Hereinafter, the detailed explanation will be presented.

Figure 10A:
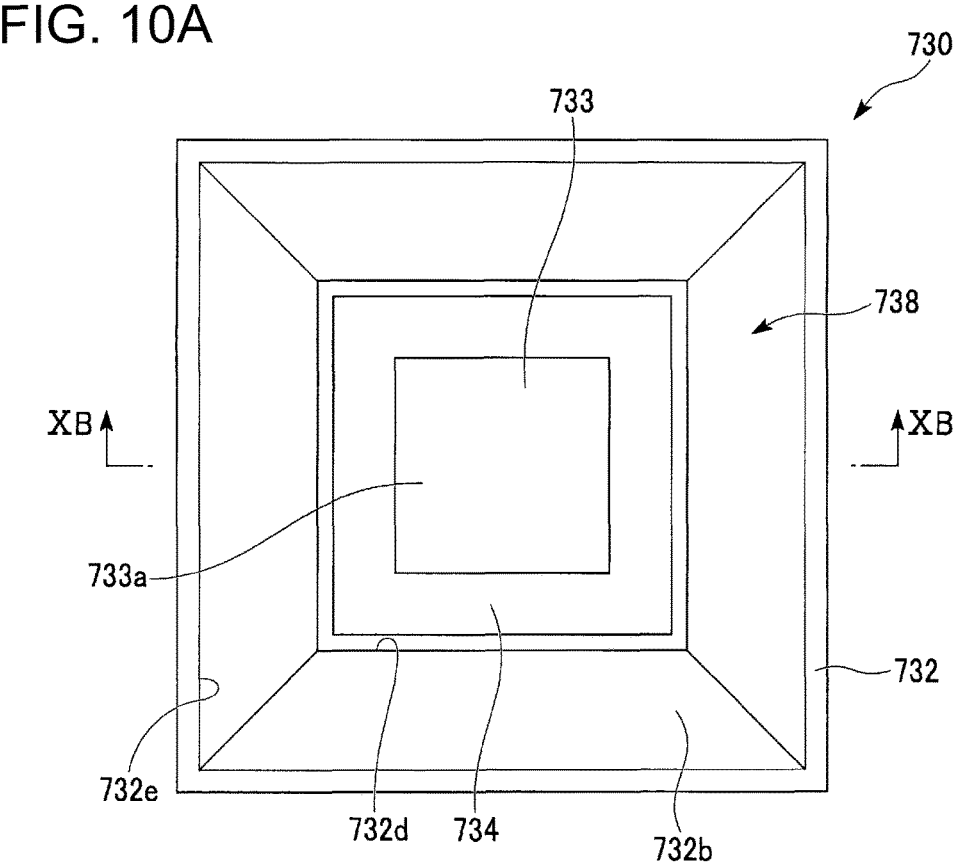
Figure 10B:
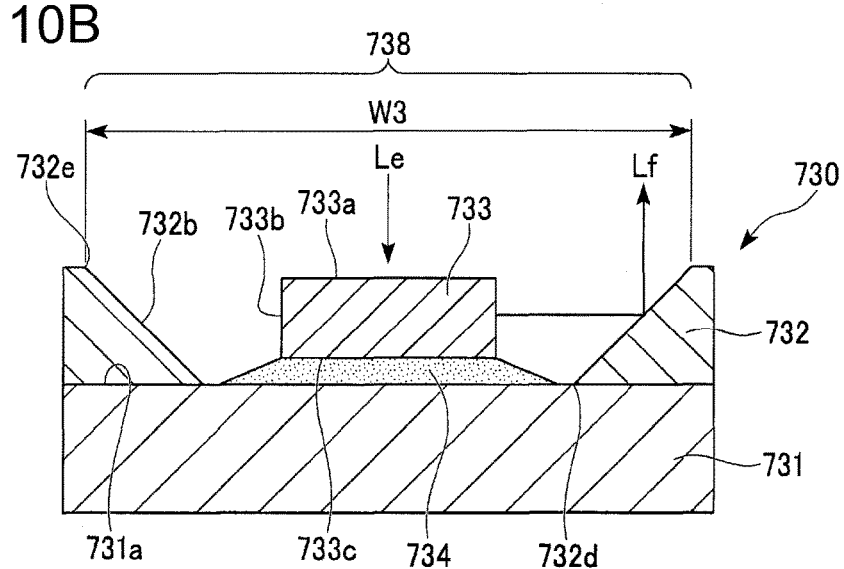

FIGS. 10A and 10B are diagrams showing a wavelength conversion element 730 according to a comparative example. FIG. 10A is a plan view. FIG. 10B is a XB-XB cross-sectional view in FIG. 10A.

The wavelength conversion element 730 according to the comparative example is provided with a substrate 731, an adhesive 734, a phosphor layer 733, and a reflecting member 732 as shown in FIGS. 10A and 10B.

The substrate 731 is the same as the substrate 31 according to the present embodiment except the point that the recessed section is not provided.

The adhesive 734 is disposed on the top surface 731a of the substrate 731. The adhesive 734 spreads to wet the surface, and runs off the phosphor layer 733 to the outside.

The phosphor layer 733 has a side surface 733b, a bottom surface 733c, and a top surface 733a opposed to the bottom surface 733c, and is fixed to the surface of the substrate 731 via the adhesive 734.

The reflecting member 732 is disposed outside the adhesive 734 on the top surface 731a of the substrate 731 so as to be opposed to the side surface 733b of the phosphor layer 733. As shown in FIG. 10A, the reflecting member 732 has a rectangular ring-like shape in the planar view. The reflecting member 732 is provided with a tilted surface 732b.

In the wavelength conversion element 730, since the adhesive 734 spreads to wet the top surface 731a of the substrate 731, it is unachievable to dispose the reflecting member 732 close to the phosphor layer 733 on the top surface 731a of the substrate 731. If the reflecting member 732 is disposed so that an inner edge 732d of the reflecting member 732 runs on the adhesive 734, it is possible to dispose the reflecting member 732 close to the phosphor layer 733. However, in this case, it is necessary to dispose the reflecting member 732 on an uneven surface, and it is difficult to reliably fix the reflecting member 732 to the substrate 731.

Therefore, the distance between the reflecting member 732 and the side surface 733b of the phosphor layer 733 becomes longer, and as a result, the width W3 of the apparent light emitting area 738 surrounded by an inner edge 732e of the end portion on the top surface 732a side in the reflecting member 732 becomes larger. Thus, the size of the fluorescence Lf emitted from the wavelength conversion element 730 becomes larger, and vignetting of a part of the fluorescence Lf by the optical elements in the latter stage occurs in some cases. Therefore, there has been a problem that the light use efficiency in the projector cannot sufficiently be improved.

In contrast, according to the present embodiment, the recessed section 31b is provided to the top surface 31M of the substrate 31, and the adhesive 34 is housed inside the recessed section 31b. Thus, the adhesive 34 is inhibited from being disposed on the flat section 31a of the substrate 31, and it is possible to dispose the reflecting member 32 adjacent to the phosphor layer 33. Therefore, the distance between the reflecting member 32 and the phosphor layer 33 can be made shorter, and thus, the width W1 of the light emitting area 38 can be made smaller. Therefore, according to the present embodiment, since the size of the fluorescence Lf emitted from the wavelength conversion element 30 can be made smaller, the light use efficiency of the projector 1000 can be improved.

Further, according to the present embodiment, since the reflecting member 32 is provided with the tilted surface 32b, the fluorescence Lf having been emitted from the side surface 33b of the phosphor layer 33 is reflected upward, namely toward the side to which the excitation light Le has been input. Therefore, the light not emitted from the phosphor layer 33 can be reduced, and thus, the light use efficiency can be improved.

Further, according to the present embodiment, since the recessed section 31b houses the phosphor layer 33 in the planar view, by disposing the phosphor layer 33 in accordance with the position of the recessed section 31b, the positioning accuracy of the phosphor layer 33 to the substrate 31 can be improved.

Further, since the adhesive 34 is housed inside the recessed section 31b, in the case of adopting the manufacturing method described above, when applying the uncured adhesive 34 to the top surface 31M of the substrate 31, the uncured adhesive 34 is retained inside the recessed section 31b. Since the phosphor layer 33 disposed on the uncured adhesive 34 is adjusted in posture so that the power is evenly received from the uncured adhesive 34, namely the phosphor layer 33 is self-aligned, the accuracy of the position and the posture of the phosphor layer 33 with respect to the recessed section 31b can be improved.

Further, according to the present embodiment, since the air gap 40 is formed between the phosphor layer 33 and the reflecting member 32, the light is refracted in the interface between the phosphor layer 33 and the air gap 40. Therefore, even in the case in which the fluorescence Lf having been emitted from the side surface 33b enters the inside of the phosphor layer 33 again, the proceeding direction of the light is changed due to the refraction. As a result, the fluorescence Lf not emitted from the wavelength conversion element 30 can be reduced, and thus, the light use efficiency can be improved.

Further, according to the present embodiment, since there is adopted the configuration of disposing the phosphor layer 33 and the reflecting member 32 on the top surface 31M of the substrate 31, manufacturing is simple and easy.

Further, according to the present embodiment, since the reflecting member 32 is fixed to the flat section 31a, the reflecting member 32 can surely be fixed to the substrate 31.

It should be noted that in the present embodiment, it is also possible to adopt the following configurations.

In the present embodiment, it is possible to use an adhesive having a reflective property instead of providing the reflecting film to the bottom surface 33c of the phosphor layer 33. Further, in the case in which the adhesive 34 has a light transmissive property, it is possible to use a substrate having a reflective property instead of providing the reflecting film to the bottom surface 33c of the phosphor layer 33.

Further, in the present embodiment, it is possible to fix the substrate 31 and the phosphor layer 33 to each other by metal bonding using metal as the adhesive 34.

Further, although in the explanation described above, the reflecting member 32 has a ring-like shape, and has a configuration of surrounding the phosphor layer 33, the invention is not limited to this example. In the present embodiment, the shape and the arrangement of the reflecting member 32 are not particularly limited providing the reflecting member 32 is disposed so as to be opposed to at least a part of the side surface 33b of the phosphor layer 33. In the present embodiment it is possible to adopt a configuration in which, for example, one, two or more reflecting members 32 each having a prismoid shape are disposed at positions opposed to the side surface 33b of the phosphor layer 33.

Further, in the present embodiment, an inner edge 32d of the reflecting member 32 may be in contact with the phosphor layer 33.

Figure 3:
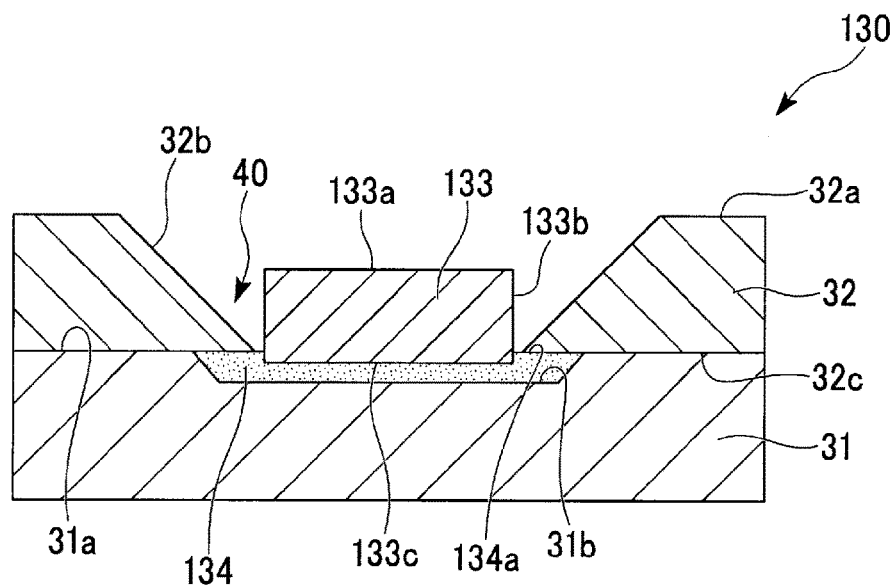
FIG. 3 is a cross-sectional view showing another example of the wavelength conversion element according to the first embodiment.
Figure 4:
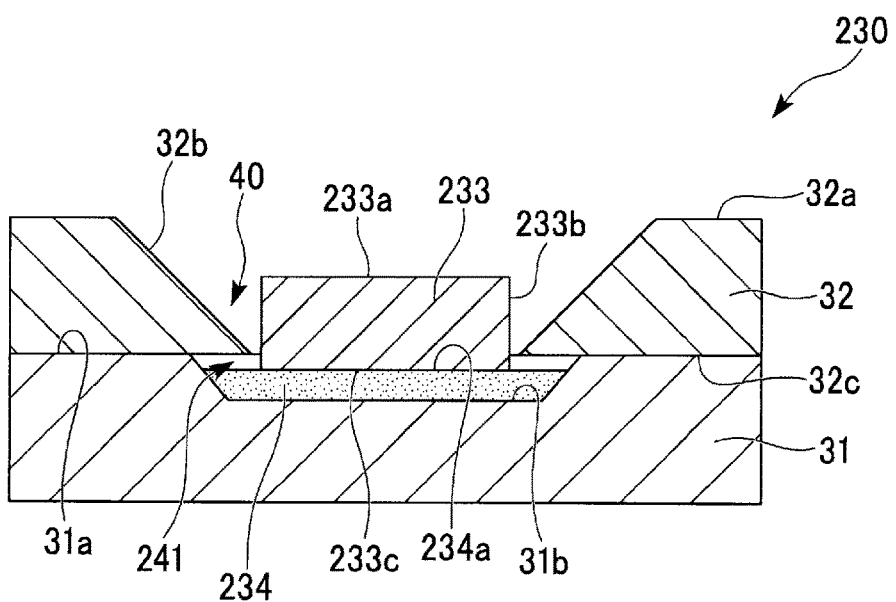
FIG. 4 is a cross-sectional view showing another example of the wavelength conversion element according to the first embodiment.

Further, in the present embodiment, as shown in FIGS. 3 and 4, the bottom surface of the phosphor layer can also be located below the flat section 31a of the substrate 31.

FIG. 3 is a cross-sectional view showing the wavelength conversion element 130 as another example of the present embodiment.

It should be noted that the constituents substantially the same as those of the embodiment described above are arbitrarily denoted by the same reference symbols, and the explanation thereof will be omitted in some cases.

The wavelength conversion element 130 is provided with the substrate 31, an adhesive 134, a phosphor layer 133, and the reflecting member 32 as shown in FIG. 3. The phosphor layer 133 has a side surface 133b, a bottom surface 133c, and a top surface 133a opposed to the bottom surface 133c.

In the adhesive 134, a top surface 134a is smoothly connected to the flat section 31a of the substrate 31 similarly to the adhesive 34 according to the embodiment explained above.

The end portion on the lower side of the phosphor layer 133 is embedded in the adhesive 134. In other words, the bottom surface 133c of the phosphor layer 133 is disposed below the flat section 31a of the substrate 31.

According to this configuration, even in the case in which there occurs the variation in amount of the adhesive 134 applied to the inside of the recessed section 31b, it is easy to adjust the position of the top surface 134a of the adhesive 134 by adjusting the subduction amount of the phosphor layer 133.

FIG. 4 is a cross-sectional view showing a wavelength conversion element 230 as another example of the present embodiment.

It should be noted that the constituents substantially the same as those of the embodiment described above are arbitrarily denoted by the same reference symbols, and the explanation thereof will be omitted in some cases.

The wavelength conversion element 230 is provided with the substrate 31, an adhesive 234, a phosphor layer 233, and the reflecting member 32 as shown in FIG. 4. The phosphor layer 233 has a side surface 233b, a bottom surface 233c, and a top surface 233a opposed to the bottom surface 233c.

The adhesive 234 is housed inside the recessed section 31b. The top surface 234a of the adhesive 234 is disposed below the flat section 31a of the substrate 31.

The phosphor layer 233 is bonded to the top surface 234a of the adhesive 234. The bottom surface 233c of the phosphor layer 233 is at the same level as the top surface 234a of the adhesive 234. In other words, the bottom surface 233c of the phosphor layer 233 is located below the flat section 31a of the substrate 31.

Between the reflecting member 32 and the adhesive 234, there is disposed an air gap 241.

According to this configuration, since the air gap 241 is disposed between the reflecting member 32 and the adhesive 234, even in the case in which the amount of the adhesive 234 is too large when applying the uncured adhesive 234 to the inside of the recessed section 31b using the manufacturing method described above, the adhesive 234 can be inhibited from overflowing from the recessed section 31b.

Further, according to this configuration, by adjusting the amount of the adhesive 234, it is easy to adjust the relationship of the height between the flat section 31a of the substrate 31 and the phosphor layer 233. Therefore, it is easy to dispose the phosphor layer 233 so that the fluorescence Lf emitted from the side surface 233b of the phosphor layer 233 is reflected by the reflecting member 32.

Second Embodiment

The second embodiment is different from the first embodiment in the point that a reflecting member 332 is not provided with the tilted surface.

It should be noted that the constituents substantially the same as those of the embodiment described above are arbitrarily denoted by the same reference symbols, and the explanation thereof will be omitted in some cases.

Figure 5A:
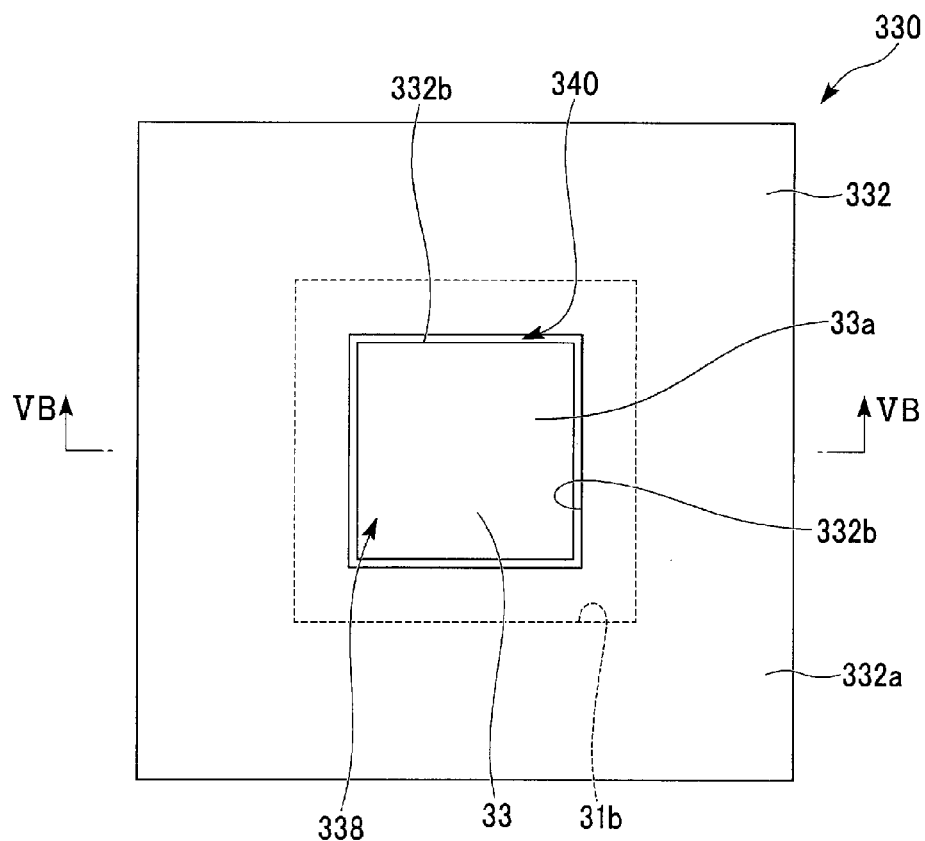
Figure 5B:
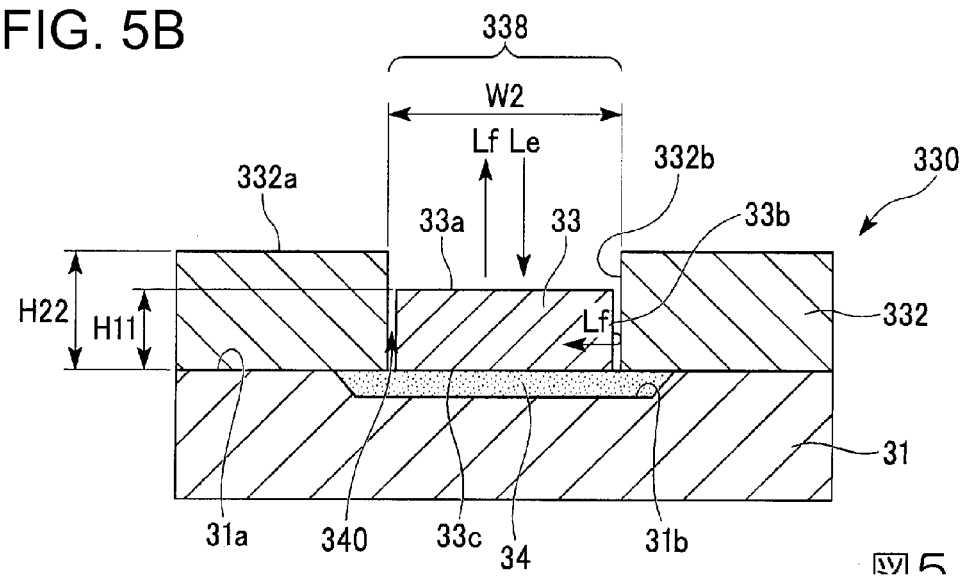

FIGS. 5A and 5B are diagrams showing a wavelength conversion element 330 according to the present embodiment. FIG. 5A is a plan view. FIG. 5B is a VB-VB cross-sectional view in FIG. 5A.

The wavelength conversion element 330 according to the present embodiment is provided with the substrate 31, the adhesive 34, the phosphor layer 33, and the reflecting member 332 as shown in FIGS. 5A and 5B.

As shown in FIG. 5A, the reflecting member 332 is a member having a rectangular ring-like shape in the planar view. The shape of the cross-section perpendicular to a top surface 332a of the reflecting member 332 has a rectangular shape. In other words, a side surface 332b of the reflecting member 332 is roughly perpendicular to the top surface 332a, and is roughly parallel to the side surface 33b of the phosphor layer 33.

The reflecting member 332 is fixed to the surface of the flat section 31a of the substrate 31 so that the side surface 332b on the inner side is opposed to the phosphor layer 33. The side surface 332b of the reflecting member 332 is disposed adjacent to the phosphor layer 33. Between the phosphor layer 33 and the reflecting member 332, there is disposed an air gap 340.

The height H22 of the top surface 332a of the reflecting member 332 is larger than the height H11 of the top surface 33a of the phosphor layer 33.

The fluorescence Lf emitted from the side surface 33b of the phosphor layer 33 out of the fluorescence Lf generated in the phosphor layer 33 is reflected by the side surface 332b of the reflecting member 332, and then reenters the inside of the phosphor layer 33. The fluorescence Lf having reentered the phosphor layer 33 is reflected or refracted to thereby be changed in direction, and is thus emitted from the top surface 33a.

In the present embodiment, the apparent light emitting area 338 is an area surrounded by the side surface 332b on the inner side of the reflecting member 332 in the planar view.

According to the present embodiment, since the side surface 332b of the reflecting member 332 is roughly parallel to the side surface 33b of the phosphor layer 33, by disposing the reflecting member 332 so that the side surface 332b is adjacent to the phosphor layer 33, the width W2 of the light emitting area 338 can be made smaller. Thus, the size of the fluorescence Lf of the wavelength conversion element 330 can be made smaller. Therefore, according to the present embodiment, the light use efficiency in the projector can be improved.

Further, according to the present embodiment, the fluorescence Lf emitted from the side surface 33b of the phosphor layer 33 is reflected by the side surface 332b of the reflecting member 332, and then reenters the phosphor layer 33. Therefore, the fluorescence Lf emitted from the side surface 33b of the phosphor layer 33 can effectively be used.

Further, according to the present embodiment, since the air gap 340 is disposed between the phosphor layer 33 and the reflecting member 332, the fluorescence Lf is refracted in the interface between the phosphor layer 33 and the air gap 340. Therefore, the angle of the fluorescence Lf, which has been reflected by the reflecting member 332 and then reentered the phosphor layer 33, is changed due to the refraction. As a result, it is easy for the fluorescence Lf having reentered the phosphor layer 33 to be emitted from the top surface 33a of the phosphor layer 33. Therefore, according to the present embodiment, the light use efficiency can be improved.

Further, according to the present embodiment, since the height H22 of the top surface 332a of the reflecting member 332 is larger than the height H11 of the top surface 33a of the phosphor layer 33, it is easy for the fluorescence Lf having been emitted from the side surface 33b of the phosphor layer 33 to be reflected by the side surface 332b of the reflecting member 332.

It should be noted that in the present embodiment, it is also possible to adopt the following configurations.

In the present embodiment, it is possible for the side surface 332b of the reflecting member 332 to be in contact with the side surface 33b of the phosphor layer 33. In other words, the air gap 340 is not required to be disposed.

Figure 6:
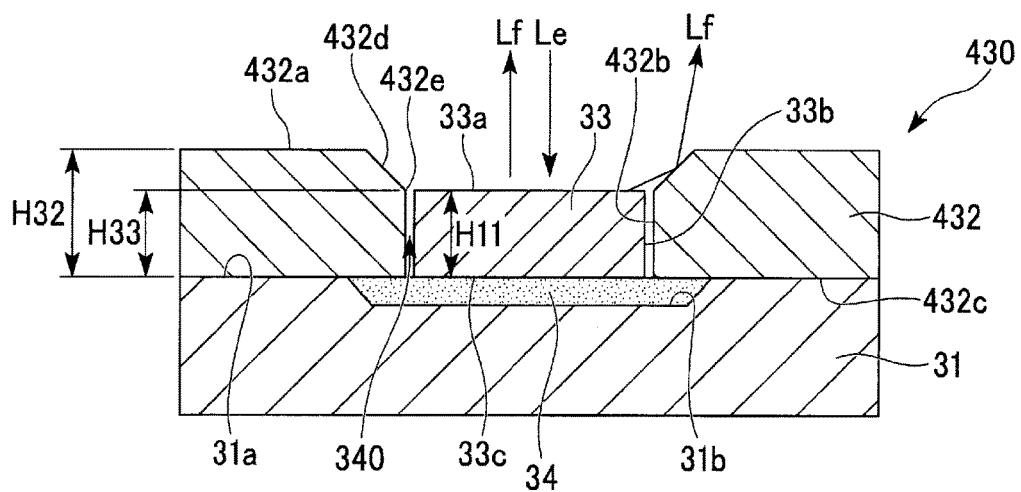
FIG. 6 is a cross-sectional view showing another example of the wavelength conversion element according to the second embodiment.

Further, in the present embodiment, it is also possible to adopt such a configuration as shown in FIG. 6.

FIG. 6 is a cross-sectional view showing a wavelength conversion element 430 as another example of the present embodiment.

It should be noted that the constituents substantially the same as those of the embodiment described above are arbitrarily denoted by the same reference symbols, and the explanation thereof will be omitted in some cases.

The wavelength conversion element 430 is provided with the substrate 31, the adhesive 34, the phosphor layer 33, and a reflecting member 432 as shown in FIG. 6.

The reflecting member 432 is different from the reflecting member 332 explained above in the point that the side surface is formed of a vertical surface 432b and a tilted surface 432d.

The vertical surface 432b is a surface roughly perpendicular to a bottom surface 432c of the reflecting member 432, and at the same time, roughly parallel to the side surface 33b of the phosphor layer 33. The vertical surface 432b connects the bottom surface 432c and the tilted surface 432d to each other. In the present embodiment, the height H33 of an upper end 432e of the vertical surface 432b is equal to the height H11 of the top surface 33a of the phosphor layer 33.

The tilted surface 432d connects the vertical surface 432b and the top surface 432a of the reflecting member 432 to each other. The tilted surface 432d is tilted so that the distance from the phosphor layer 33 increases in the upward direction from the upper end 432e of the vertical surface 432b.

In the present embodiment, since the height H33 of the upper end 432e of the vertical surface 432b is equal to the height H11 of the top surface 33a of the phosphor layer 33, the tilted surface 432d is disposed above the top surface 33a of the phosphor layer 33. In other words, the side surface of the reflecting member 432 opposed to the phosphor layer 33 is provided with the tilted surface 432d in the area higher than at least the top surface 33a of the phosphor layer 33.

The height H32 of the top surface 432a of the reflecting member 432 is larger than the height H11 of the top surface 33a of the phosphor layer 33.

Since the fluorescence Lf is emitted from the top surface 33a of the phosphor layer 33 so as to significantly be diffused, in the case in which the side surface 332b is vertical, and the height H22 of the top surface 332a of the reflecting member 332 is larger than the height H11 of the top surface 33a of the phosphor layer 33 as in the case of the wavelength conversion element 330 according to the present embodiment shown in FIG. 5B, a part of the fluorescence Lf having been emitted from the top surface 33a of the phosphor layer 33 hits the side surface 332b of the reflecting member 332 to be reflected in some cases. In this case, since the emission angle of the fluorescence Lf thus reflected is large, there is a possibility that vignetting by the optical members in the latter stage occurs after the fluorescence Lf has been emitted from the wavelength conversion element 330. It should be noted that the angle formed between the proceeding direction of the light and the normal line of the top surface 31M of the substrate 31 is defined as the emission angle.

In contrast, according to the configuration, the tilted surface 432d is disposed in an area higher than the top surface 33a of the phosphor layer 33 in the reflecting member 432. Therefore, the fluorescence Lf, which has been emitted from the top surface 33a of the phosphor layer 33 with a large emission angle, and then reflected by the tilted surface 432d, is converted into the light with a small emission angle. Therefore, according to this configuration, the light blocked by other optical members can be reduced, and the light use efficiency can be inhibited from degrading.

Further, since the excitation light Le entering the phosphor layer 33 enters there in a focused state, the incident angles to the phosphor layer 33 are distributed in a wide range. Therefore, in such a wavelength conversion element 330 as shown in FIG. 5B, there is a possibility that a part of the excitation light Le hits the inner edge of the top surface 332a of the reflecting member 332 to be reflected, and fails to enter the phosphor layer 33.

In contrast, according to the configuration shown in FIG. 6, since the tilted surface 432d is provided, the phosphor layer 33 can efficiently be irradiated with the excitation light Le.

It should be noted that the height H33 of the upper end 432e of the vertical surface 432b can be smaller than the height H11 of the top surface 33a of the phosphor layer 33, or larger than the height H11. However, it is preferable that the height H33 is equal to or smaller than the height H11.

Further, in the present embodiment, it is possible to make the height H22 equal to or smaller than the height H11. According to this configuration, there is no chance for the fluorescence Lf emitted from the top surface 33a of the phosphor layer 33 and the excitation light Le entering the top surface 33a to be reflected by the reflecting member 332, and thus, the light use efficiency can be inhibited from degrading. In order to effectively use the light emitted from the side surface 33b of the phosphor layer 33, it is preferable that the height H22 is equal to the height H11.

Third Embodiment

The third embodiment is different from the first embodiment in the point that a recessed section 531b has a rectangular ring-like shape in the planar view.

It should be noted that the constituents substantially the same as those of the embodiment described above are arbitrarily denoted by the same reference symbols, and the explanation thereof will be omitted in some cases.

Figure 7A:
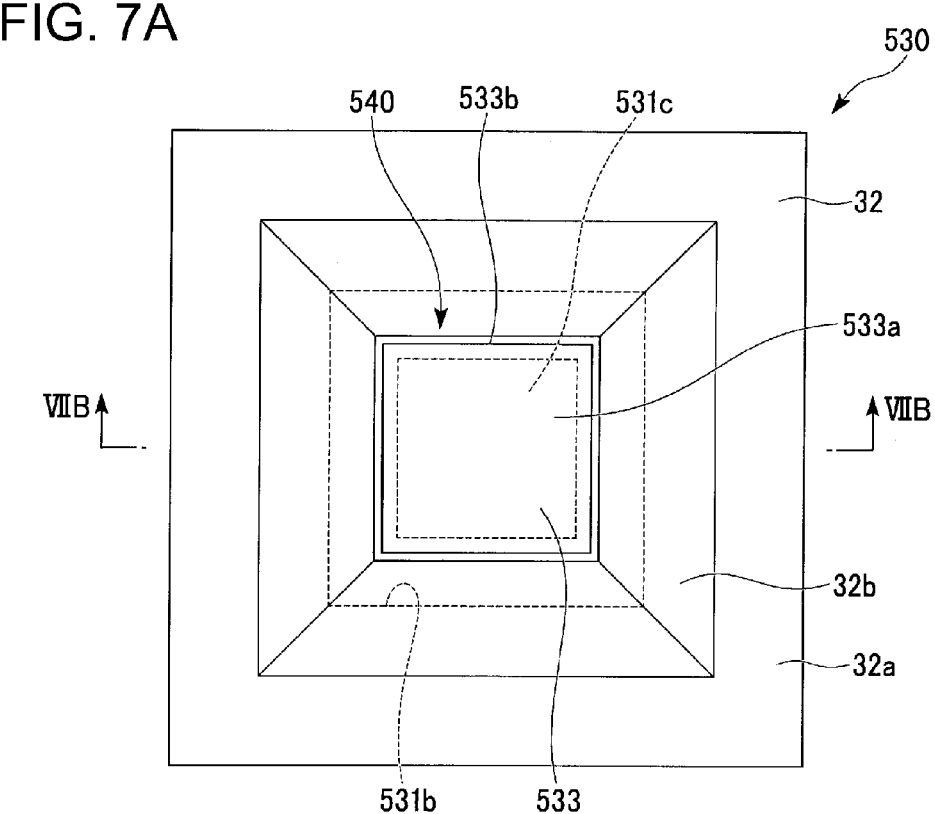
Figure 7B:
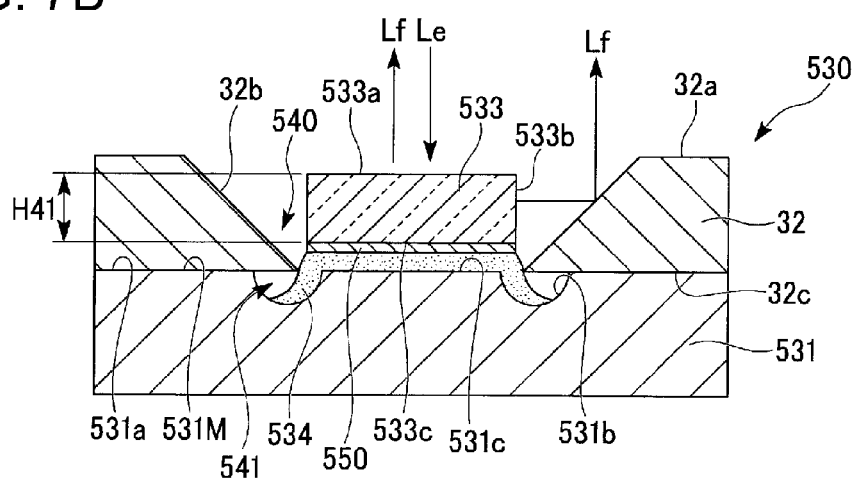

FIGS. 7A and 7B are diagrams showing a wavelength conversion element 530 according to the present embodiment. FIG. 7A is a plan view. FIG. 7B is a VIIB-VIIB cross-sectional view in FIG. 7A.

The wavelength conversion element 530 according to the present embodiment is provided with a substrate 531, an adhesive 534, a phosphor layer 533, and the reflecting member 32 as shown in FIGS. 7A and 7B. The phosphor layer 533 has a side surface 533b, a bottom surface 533c, and a top surface 533a opposed to the bottom surface 533c. The planar view shape of the phosphor layer 533 is, for example, a rectangular shape.

A top surface 531M of the substrate 531 is provided with a flat section 531a and a recessed section 531b.

The planar view shape of the recessed section 531b is a ring-like shape, and can also be a rectangular ring-like shape, an annular shape, or a polygonal ring-like shape. In the present embodiment, as the planar view shape of the recessed section 531b, there is used a rectangular ring-like shape so as to correspond to the planar view shape of the phosphor layer 533 as shown in FIG. 7A. The shape of the cross-section of the recessed section 531b perpendicular to the flat section 531a is not particularly limited, but can also be a rectangular shape, or can also be a semicircular shape. In the present embodiment, the cross-sectional shape of the recessed section 531b is, for example, a semicircular shape as shown in FIG. 7B.

The adhesive 534 is disposed so as to straddle a central portion 531c surrounded by the recessed section 531b on the top surface 531M of the substrate 531 and the inside of the recessed section 531b. A part of the adhesive 534 running off the phosphor layer 533 in the planar view is received in the recessed section 531b.

The phosphor layer 533 is disposed on the part of the adhesive 534 disposed on the central portion 531c. The phosphor layer 533 is transparent. In other words, the phosphor layer 533 is formed of a transparent fluorescent material. The phosphor layer 533 is formed of a single crystal having no interface, or a continuous polycrystal.

On the bottom surface 533c of the phosphor layer 533, there is disposed a reflecting film 550. The reflecting film 550 is formed of, for example, metal high in reflectance such as silver (Ag) or aluminum (Al).

The phosphor layer 533 is designed so that all of the excitation light Le having entered the phosphor layer 533 through the top surface 533a is converted into the fluorescence Lf during the period until the excitation light Le is reflected by the reflecting film 550 and then returns again to the top surface 533a. Thus, in the present embodiment, the light emitted from the phosphor layer 533 is formed of the fluorescence Lf generated in the phosphor layer 533.

Between the phosphor layer 533 and the reflecting member 32, there is disposed an air gap 540.

Between the reflecting member 32 and the adhesive 534 in the inside of the recessed section 531b, there is disposed an air gap 541.

According to the present embodiment, since the recessed section 531b having the ring-like shape is disposed, when applying the uncured adhesive 534 to the central portion 531c of the top surface 531M of the substrate 531, the part running off the central portion 531c is received by the inside of the recessed section 531b. Thus, the reflecting member 32 can be disposed at the position adjacent to the phosphor layer 533. Therefore, according to the present embodiment, the light use efficiency can be improved.

Further, according to the present embodiment, since the recessed section 531b is provided with the air gap 541, even in the case in which the amount of the adhesive 534 becomes too large, the adhesive 534 can be inhibited from overflowing from the recessed section 531b.

Further, in the case in which a crystal interface or an air hole exists in the phosphor layer, the excitation light Le having entered the top surface of the phosphor layer is multiply scattered by the crystal interface or the air hole. Therefore, the excitation light Le fails to go straight through the phosphor layer, and is converted into the fluorescence while being multiply scattered in the vicinity of the top surface. Therefore, the fluorescence conversion amount is relatively large in the vicinity of the top surface of the phosphor layer, and the heat generation amount is locally large in the vicinity of the top surface. Thus, there is a possibility that the temperature in the vicinity of the top surface of the phosphor layer excessively rises to cause the thermal quenching. Further, in the case in which the phosphor layer is formed of, for example, inorganic ceramic, since the thermal conductivity lowers with the rise in temperature, the heat is easily confined inside the phosphor layer, and there is a possibility that the temperature synergistically rises.

Due to the circumstances described above, there is a problem that the light intensity of the excitation light Le, which can be applied to the phosphor layer, is limited.

To deal with this problem, according to the present embodiment, the phosphor layer 533 does not include the crystal interface or the air hole as the scattering component, and is therefore transparent. Therefore, the excitation light Le is difficult to be scattered in the phosphor layer 533, and thus the component, which can reach the bottom surface 533c of the phosphor layer 533, increases. Thus, the fluorescence conversion amount is distributed in the height direction (the thickness direction) of the phosphor layer 533, and the distribution of the temperature in the phosphor layer 533 in the height direction becomes broad. Therefore, the top surface 533a of the phosphor layer 533 is inhibited from becoming relatively high in temperature. Further, due to the above, the highest temperature in the phosphor layer 533 also drops.

As described above, according to the present embodiment, since the temperature of the phosphor layer 533 is difficult to rise, the light intensity of the excitation light Le to be applied to the phosphor layer 533 can be increased. As a result, the amount of the fluorescence Lf to be emitted from the phosphor layer 533 can be increased.

Further, in the phosphor layer of the related art, it is designed that all of the excitation light Le having entered through the top surface is converted into the fluorescence Lf before hitting the reflecting film disposed on the bottom surface. Therefore, there is a problem that the thickness of the phosphor layer, namely the height of the phosphor layer becomes large.

To deal with the problem, according to the present embodiment, it is designed that all of the excitation light Le having entered through the top surface 533a of the phosphor layer 533 is converted into the fluorescence Lf before the excitation light Le returns to the top surface 533a after reflecting off the reflecting film 550 disposed on the bottom surface 533c. Therefore, the thickness of the phosphor layer 533, namely the height H41, can be made smaller. Therefore, according to the present embodiment, the thermal path from the top surface 533a of the phosphor layer 533 to the substrate 531 can be made shorter to thereby improve the heat radiation efficiency. As a result, it is possible to further inhibit the temperature of the phosphor layer 533 from rising.

It should be noted that in the first embodiment and the second embodiment described above, it is also possible to use a transparent phosphor layer. In the case of using the transparent phosphor layer, a large amount of fluorescence Lf is also generated in the vicinity of the bottom surface of the phosphor layer. Further, it is easy for the fluorescence Lf generated in the phosphor layer to go straight in all directions without being scattered. Thus, the amount of the fluorescence Lf emitted from the side surface increases. Therefore, the first through third embodiment described above are particularly effective in the case of making the phosphor layer transparent.

Fourth Embodiment

The fourth embodiment is provided with a rotary wavelength conversion element.

It should be noted that the constituents substantially the same as those of the embodiment described above are arbitrarily denoted by the same reference symbols, and the explanation thereof will be omitted in some cases.

Figure 8:
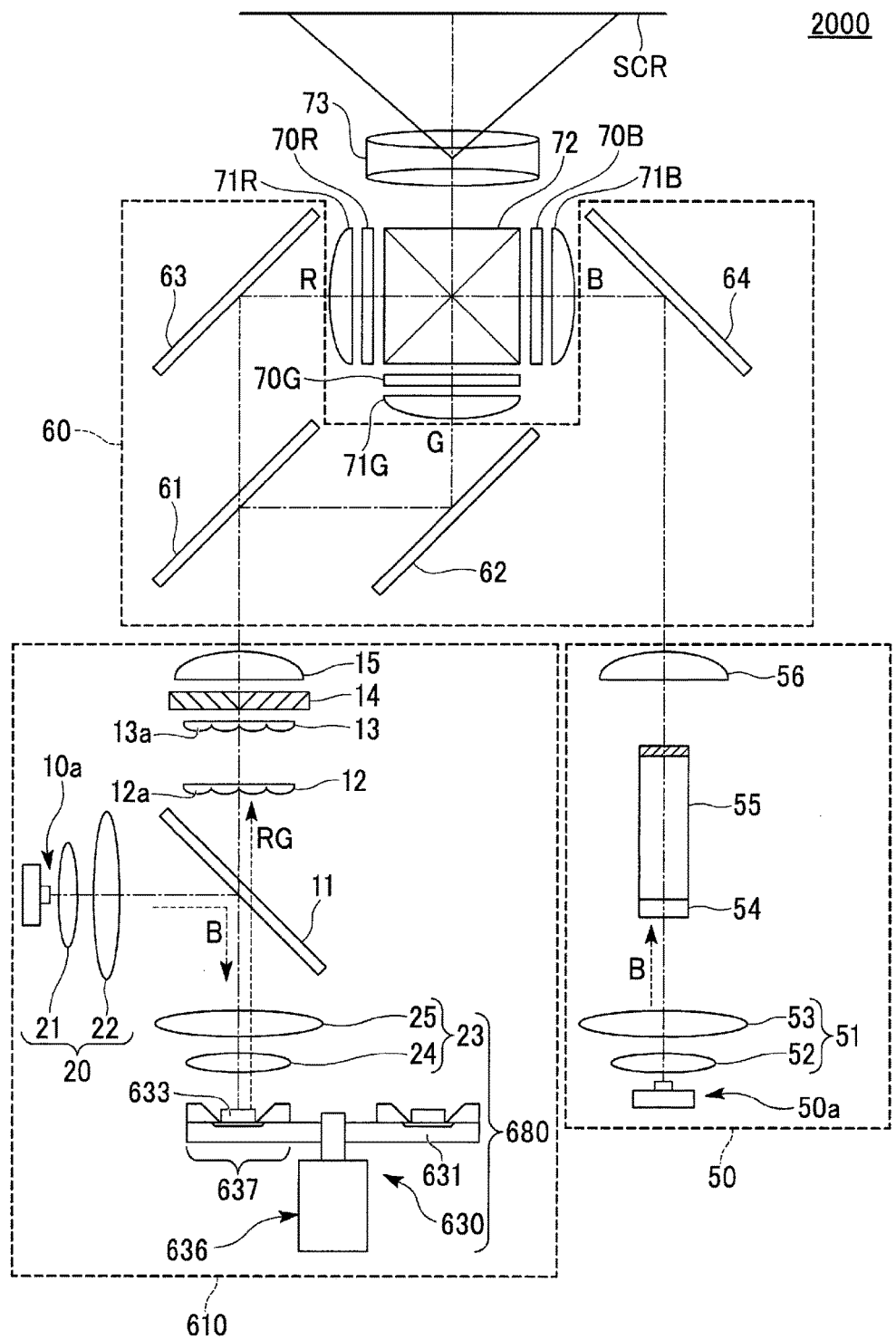
FIG. 8 is a general configuration diagram showing a projector according to a fourth embodiment of the invention.
Figure 9A:
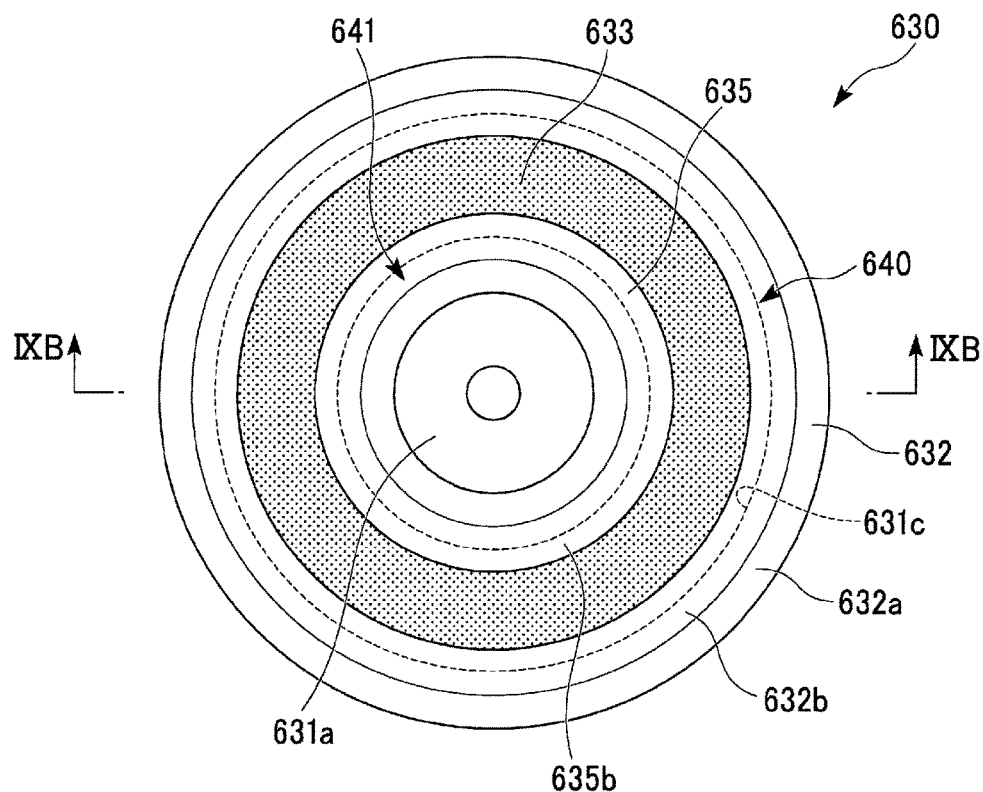
Figure 9B:
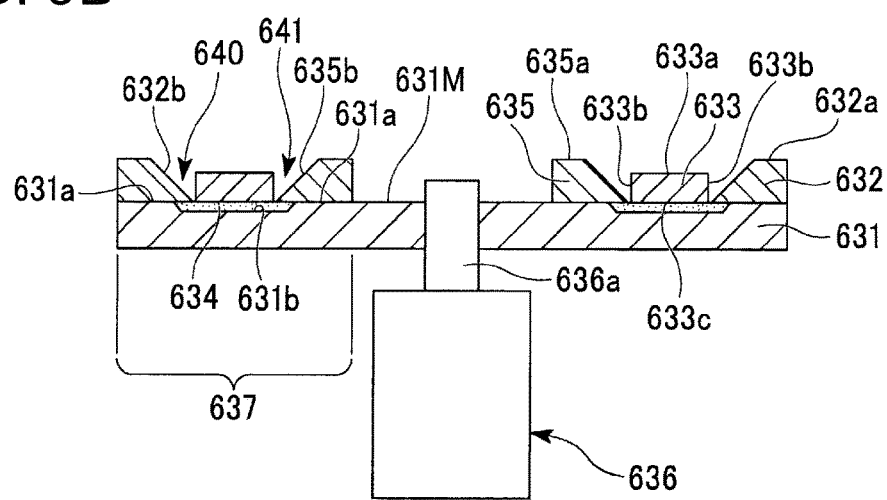

FIG. 8 is a schematic configuration diagram showing a projector 2000 according to the present embodiment. FIGS. 9A and 9B are diagrams showing a wavelength conversion element 630 according to the present embodiment. FIG. 9A is a plan view. FIG. 9B is a IXB-IXB cross-sectional view in FIG. 9A.

The projector 2000 according to the present embodiment is provided with an illumination device 610 as shown in FIG. 8. The illumination device 610 is provided with a light source device 680.

The light source device 680 is provided with the light collection optical system 23 and the wavelength conversion element 630 in the present embodiment.

The wavelength conversion element 630 is provided with a circular disk 631, an adhesive 634, an outer reflecting member 632, an inner reflecting member 635, a phosphor layer 633, and a rotational mechanism 636 as shown in FIGS. 9A and 9B. The circular disk 631 corresponds to a substrate in the appended claims. The outer reflecting member 632 and the inner reflecting member 635 correspond to a reflecting member in the appended claims.

A top surface 631M of the circular disk 631 is provided with a flat section 631a and a recessed section 631b as shown in FIG. 9B.

As shown in FIG. 9A, the recessed section 631b has an annular shape in the planar view.

The adhesive 634 has an annular shape in the planar view, and is received inside the recessed section 631b as shown in FIG. 9B.

The phosphor layer 633 has a side surface 633b, a bottom surface 633c, and a top surface 633a opposed to the bottom surface 633c. The planar view shape of the phosphor layer 633 is an annular shape. The shape of the cross-section perpendicular to the top surface 633a of the phosphor layer 633 is a rectangular shape. The phosphor layer 633 is fixed to the circular disk 631 with the adhesive 634. A reflecting film not shown is provided to the bottom surface 633c of the phosphor layer 633.

As shown in FIG. 9A, the outer reflecting member 632 has an annular shape in the planar view. The outer reflecting member 632 is disposed on the flat section 631a outer than the phosphor layer 633 in the top surface 631M so as to be opposed to the outer side surface 633b of the phosphor layer 633. The outer reflecting member 632 is provided with a tilted surface 632b opposed to the side surface 633b of the phosphor layer 633.

The tilted surface 632b is tilted so that the distance from the phosphor layer 633 increases in the direction from the flat section 631a of the circular disk 631 toward the top surface 632a of the outer reflecting member 632. In other words, the tilted surface 632b is tilted toward the outer side of the circular disk 631.

The inner reflecting member 635 has an annular shape in the planar view. The inner reflecting member 635 is disposed on the flat section 631a inner than the phosphor layer 633 in the top surface 631M so as to be opposed to the inner side surface 633b of the phosphor layer 633. The inner reflecting member 635 is provided with a tilted surface 635b opposed to the side surface 633b of the phosphor layer 633.

The tilted surface 635b is tilted so that the distance from the phosphor layer 633 increases in the direction from the flat section 631a of the circular disk 631 toward the top surface 635a of the inner reflecting member 635. In other words, the tilted surface 635b is tilted toward the inner side of the circular disk 631.

Between the phosphor layer 633 and the outer reflecting member 632, there is disposed an air gap 640. Between the phosphor layer 633 and the inner reflecting member 635, there is disposed an air gap 641.

The rotational mechanism 636 is provided with an output shaft 636a. The output shaft 636a is inserted in the center of the circular disk 631, and is fixed to the circular disk 631. The rotational mechanism 636 rotates the circular disk 631 around the output shaft 636a.

As shown in FIG. 8, in the state in which the circular disk 631 is rotated by the rotational mechanism 636, a part of the phosphor layer 633 having the annular shape disposed on the circular disk 631 is irradiated with the excitation light, and thus the fluorescence is emitted from the wavelength conversion element 630. The part of the wavelength conversion element 630 irradiated with the excitation light is defined as a wavelength conversion section 637. The cross-sectional shape of the wavelength conversion section 637 is substantially the same as the cross-sectional shape of the wavelength conversion element 30 according to the first embodiment.

According to the present embodiment, since the phosphor layer 633 is disposed on the circular disk 631 rotated by the rotational mechanism 636 so as to have the annular shape, the position in the phosphor layer 633 irradiated with the excitation light moves in accordance with the rotation of the circular disk 631, and the heat generation places in the phosphor layer 633 are distributed. As a result, it is possible to inhibit the temperature of the phosphor layer 633 from significantly rising.

It should be noted that although in the explanation described above, it is assumed that the cross-sectional shape of the wavelength conversion section 637 is substantially the same as the cross-sectional shape of the wavelength conversion element 30 according to the first embodiment, the invention is not limited to this configuration. In the present embodiment, it is also possible to assume that the cross-sectional shape of the wavelength conversion section is substantially the same as the cross-sectional shape of the wavelength conversion element according to the second embodiment or the third embodiment.

It should be noted that although in the above description of the first through fourth embodiments, the example of using the reflective wavelength conversion element is explained, the invention is not limited to the configuration, but a transmissive wavelength conversion element can also be adopted. In such a case, the phosphor layer 533 of the wavelength conversion element 530 according to the third embodiment is designed so that all of the excitation light Le is converted into the fluorescence Lf while the excitation light Le proceeds between the top surface 533a and the bottom surface 533c.

Further, although in the embodiments described above, the three liquid crystal panels 70R, 70G, and 70B are adopted as the light modulation device, the invention is not limited to this configuration, but it is also possible to adopt, for example, a liquid crystal panel for displaying a color image with a single liquid crystal panel as the light modulation device.

Further, although in the embodiments described above, the phosphor layer for generating the red light and the green light is used, the invention is not limited to this configuration. It is also possible to use, for example, a phosphor layer for generating either one of the red light and the green light. Further, a phosphor layer for generating white light can also be used.

Further, although in the embodiments described above, the liquid crystal panels 70R, 70G, and 70B, which are the transmissive light modulation devices, are adopted as the light modulation device, the invention is not limited to this configuration, but it is also possible to adopt other types of light modulation device such as a reflective light modulation device or a micromirror light modulation device as the light modulation device. It should be noted that as the micromirror light modulation device, a Digital Micromirror Device (DMD), for example, can be adopted.

Further, although in each of the embodiments described above, there is explained the example of applying the light source device according to the invention to the projector, the invention is not limited to this example. The light source device according to the invention can also be applied to a lighting apparatus, a headlight of a vehicle, an optical disk drive, and so on.

The entire disclosure of Japanese Patent Application No. 2014-114733, filed on Jun. 3, 2014 is expressly incorporated by reference herein.

What is claimed is:

1. A light source device comprising:
a phosphor layer having a side surface, a bottom surface, and a top surface opposed to the bottom surface;
a reflecting member opposed to the side surface of the phosphor layer;
a substrate disposed on the bottom surface side of the phosphor layer; and
an adhesive adapted to bond the phosphor layer and the substrate to each other,
wherein:
a surface of the substrate located on the phosphor layer side includes a recessed section overlapping the reflecting member on at least an outer side of the phosphor layer in a planar view,
a part of the adhesive running off the phosphor layer is received by the recessed section,
fluorescence generated in the phosphor layer is emitted from the top surface and the side surface, and
an air gap is disposed between (1) the side surface of the phosphor layer and (2) the reflecting member.

2. The light source device according to claim 1, wherein the recessed section extends to a part below the phosphor layer, and includes the phosphor layer in the planar view.

3. The light source device according to claim 1, wherein an air gap is disposed between the reflecting member and the adhesive.

4. The light source device according to claim 1, wherein a side surface of the reflecting member opposed to the phosphor layer has a tilted surface disposed in an area higher than at least the top surface using the bottom surface as a basis of height.

5. The light source device according to claim 1, wherein the reflecting member is disposed on the substrate.

6. The light source device according to claim 1, further comprising:
a rotational mechanism adapted to rotate the substrate.

7. The light source device according to claim 1, wherein the phosphor layer is transparent.

8. The light source device according to claim 7, wherein the light emitted from the phosphor layer includes the fluorescence generated in the phosphor layer.

9. A projector comprising:
a light source device adapted to emit illumination light;
a light modulation device adapted to modulate the illumination light in accordance with image information to form image light; and
a projection optical system adapted to project the image light,
wherein the light source device according to claim 1 is used as the light source device.

10. A projector comprising:
a light source device adapted to emit illumination light;
a light modulation device adapted to modulate the illumination light in accordance with image information to form image light; and
a projection optical system adapted to project the image light,
wherein the light source device according to claim 2 is used as the light source device.

11. A projector comprising:
a light source device adapted to emit illumination light;
a light modulation device adapted to modulate the illumination light in accordance with image information to form image light; and
a projection optical system adapted to project the image light,
wherein the light source device according to claim 3 is used as the light source device.

12. A projector comprising:
a light source device adapted to emit illumination light;
a light modulation device adapted to modulate the illumination light in accordance with image information to form image light; and
a projection optical system adapted to project the image light,
wherein the light source device according to claim 4 is used as the light source device.

13. A projector comprising:
a light source device adapted to emit illumination light;
a light modulation device adapted to modulate the illumination light in accordance with image information to form image light; and
a projection optical system adapted to project the image light,
wherein the light source device according to claim 5 is used as the light source device.

14. A projector comprising:
a light source device adapted to emit illumination light;
a light modulation device adapted to modulate the illumination light in accordance with image information to form image light; and
a projection optical system adapted to project the image light,
wherein the light source device according to claim 6 is used as the light source device.

15. A projector comprising:
a light source device adapted to emit illumination light;
a light modulation device adapted to modulate the illumination light in accordance with image information to form image light; and
a projection optical system adapted to project the image light,
wherein the light source device according to claim 7 is used as the light source device.

16. A projector comprising:
a light source device adapted to emit illumination light;
a light modulation device adapted to modulate the illumination light in accordance with image information to form image light; and
a projection optical system adapted to project the image light,
wherein the light source device according to claim 8 is used as the light source device.

* * * * *